(12) United States Patent
Brouwer et al.

(10) Patent No.: US 11,242,191 B2
(45) Date of Patent: Feb. 8, 2022

(54) PRESSURE CONTROL SYSTEM

(71) Applicant: AIROPACK TECHNOLOGY GROUP B.V., RK Waalwijk (NL)

(72) Inventors: Mark Brouwer, RK Waalwijk (NL); Quint Kelders, RK Waalwijk (NL)

(73) Assignee: AIROPACK TECHNOLOGY GROUP B.V., Waalwijk (NL)

( * ) Notice: Subject to any disclaimer, the term of this patent is extended or adjusted under 35 U.S.C. 154(b) by 0 days.

(21) Appl. No.: 15/546,322

(22) PCT Filed: Jan. 25, 2016

(86) PCT No.: PCT/EP2016/051435
§ 371 (c)(1),
(2) Date: Jul. 26, 2017

(87) PCT Pub. No.: WO2016/120199
PCT Pub. Date: Aug. 4, 2016

(65) Prior Publication Data
US 2017/0327300 A1 Nov. 16, 2017

(30) Foreign Application Priority Data
Jan. 27, 2015 (EP) ..................................... 15152766

(51) Int. Cl.
*B65D 83/38* (2006.01)
*B65D 83/66* (2006.01)
(Continued)

(52) U.S. Cl.
CPC .......... *B65D 83/38* (2013.01); *B29C 65/1635* (2013.01); *B29C 65/1677* (2013.01);
(Continued)

(58) Field of Classification Search
CPC ...... B65D 83/38; B65D 83/663; B65D 83/14; B65D 11/06; B65D 83/625; B67D 1/04;
(Continued)

(56) References Cited

U.S. PATENT DOCUMENTS 2,553,259 A * 5/1951 Hagedorn ........... B29C 65/1435
156/272.2
3,815,793 A * 6/1974 Morane ................ B65D 83/663
222/399

(Continued)

FOREIGN PATENT DOCUMENTS

| CH | 553 699 A | 9/1974 |
| WO | 2005/082744 A1 | 9/2005 |
| WO | 2014/083531 A2 | 6/2014 |

OTHER PUBLICATIONS

International Search Report for PCT Serial No. PCT/EP2016/051435 dated May 10, 2016.
(Continued)

*Primary Examiner* — Vishal Pancholi
*Assistant Examiner* — Robert K Nichols, II
(74) *Attorney, Agent, or Firm* — Lathrop GPM LLP; Wm. Tucker Griffith

(57) ABSTRACT

A novel pressure control system is provided for maintaining a constant predetermined excess pressure in a fluid dispensing container, comprising a high-pressure plastic vessel having an inner chamber, a closed end and an open end, and a pressure control device with a valve, which pressure control device is mounted on the open end of the high-pressure vessel, whereas a passageway is provided from the inner chamber to the outside, which is controlled by the valve, wherein the high-pressure vessel is essentially spherical.

10 Claims, 4 Drawing Sheets

(51) Int. Cl.
  *B29C 65/16* (2006.01)
  *B29C 65/00* (2006.01)
  *B65D 83/64* (2006.01)
  *B29L 31/00* (2006.01)

(52) U.S. Cl.
  CPC ...... *B29C 66/5432* (2013.01); *B29C 66/5452* (2013.01); *B29C 66/636* (2013.01); *B65D 83/64* (2013.01); *B65D 83/663* (2013.01); *B29C 66/545* (2013.01); *B29L 2031/7142* (2013.01)

(58) Field of Classification Search
  CPC .. B67D 1/0443; B67D 1/0406; B67D 1/0437; B67D 1/0418; B29C 66/5432; B29C 66/5452; B29C 66/636; B29C 66/54; B29C 66/122; B29C 65/06; B05B 9/047; C09K 3/30; F17C 2201/0128; F17C 1/00; F17C 7/00; F17C 7/02; F17C 2201/00; F17C 2201/01; F17C 2203/066; F16J 12/00
  USPC ....... 222/394, 389; 220/4.13, 584, 4.12, 581
  See application file for complete search history.

(56) References Cited

U.S. PATENT DOCUMENTS

| | | | | |
|---|---|---|---|---|
| 4,552,281 | A | * | 11/1985 | Schneider ............... B29C 66/54 220/4.13 |
| 5,211,306 | A | * | 5/1993 | Delonge-Immik ... B60R 21/268 220/588 |
| 5,547,533 | A | * | 8/1996 | Berglund ............ B29C 65/5042 156/158 |
| 7,396,019 | B2 | * | 7/2008 | Barranco ............... B65D 83/38 277/500 |
| 2008/0157420 | A1 | * | 7/2008 | Mayer ................ B01D 46/0001 264/157 |
| 2015/0144664 | A1 | * | 5/2015 | Franssen ................ B29C 66/54 222/547 |
| 2017/0113915 | A1 | * | 4/2017 | Wolthers .............. B67D 1/0412 |

OTHER PUBLICATIONS

Written Opinion of the International Searching Authority for PCT. Serial No. PCT/EP2016/051435 dated May 9, 2016.

* cited by examiner

PRESSURE CONTROL SYSTEM

CROSS-REFERENCE TO RELATED APPLICATIONS

This application is a National Stage application of International Patent Application No. PCT/EP2016/051435, filed on Jan. 25, 2016, which claims priority to European Patent Application No. EP15152766.0, filed on Jan. 27, 2015, each of which is hereby incorporated by reference in its entirety.

TECHNICAL FIELD

The invention pertains to a pressure control system provided for maintaining a constant predetermined excess pressure in a fluid dispensing container, comprising a high-pressure plastic vessel having an inner chamber and a closed end and an open end, and a pressure control system with a valve, which pressure control device is mounted on the open end of the high-pressure vessel, whereas a passageway is provided from the inner chamber to the outside, which is controlled by the valve.

BACKGROUND OF THE INVENTION

Such a pressure control system is described in WO-A-2005/082744, wherein the high-pressure vessel is substantially cylindrical with a tapered neck portion and a flange, on which a ring-shaped insert or closure with a step-like funnel is mounted. The pressure control device of this document is provided within the ring-shaped closure by a cup-like cylinder having a closed end and an open end, in which a piston with a downward protruding stem and a broader cylindrical end portion is movable mounted. At the open end of the step-like funnel an O-ring is pinched by a ring-cylinder, whereas the broader cylindrical portion of the stem and the O-ring provide a valve which is moved reciprocated by the pressure of the air in the chamber formed by the piston and the cup-like cylinder with its closed end. The high-pressure vessel must stand an overpressure of 8 bar so that the construction should be very stable. For this reason the high-pressure vessel is widened gradually towards its lower end with a broader end portion and an inwardly projecting rim, on which the end of a plastic fluid dispensing container rests. The bottom part of the high-pressure vessel has a ring-shaped depression which is reinforced with a central opening, in which a so-called Nicholson plug of rubber is pressed.

In the present construction the high-pressure vessel is closed by a moulded bottom plate. With today's plastic material not all conditions as strength, creep, air permeability, resistance to heat and cold, chemical resistance against known chemicals, etc. can be fulfilled. If the vessel has to be enlarged, forces on the bottom plate will become much larger, so that the maximum volume of the present vessel is restricted.

The volume of the high-pressure vessel is further restricted by the production process of stretch blow moulding, i.e. in order to obtain a reinforced opening at both ends of the high-pressure vessel the process of stretching the heated plastic depends on the thickness of the preform before stretching. In practice the preform can be expanded only to a predefined width and length to obtain the prescribed stability.

SUMMARY OF THE INVENTION

It is an object of the present invention to provide a pressure control system with a high-pressure vessel which may have a larger volume as the known high-pressure vessel. This object of the invention is accomplished by a pressure control system with the features of claim 1.

According to embodiments of the invention, the pressure control system provided for maintaining a constant predetermined excess pressure in a fluid dispensing container, comprising a high-pressure plastic vessel having an inner chamber and a closed end and an open end. The pressure control system further comprised a pressure control device with a valve, which pressure control device is mounted on the open end of the high-pressure vessel, whereas a passageway is provided from the inner chamber to the outside, which is controlled by the valve. A further feature of the invention is that the high-pressure vessel is essentially spherical. Through the essentially spherical shape of the high-pressure vessel, the high-pressure vessel has a larger volume compared with other vessel shapes.

The present invention has the main advantage, since the vessel is spherical that can withstand larger forces so that the diameter of the high-pressure vessel can be enlarged and the vessel can be provided for higher pressures.

A further advantage of the present invention is that the production of the high-pressure vessel is more cost effective.

Further advantages of the invention can be derived from the dependent claims and from the description below.

According to an embodiment of the fluid dispensing system, the high-pressure vessel comprises an upper hemisphere and a lower hemisphere connected by a ring shaped member. The ring shaped member allows a pressure proved connection between the upper hemisphere and a lower hemisphere.

According to a further embodiment of the fluid dispensing system, the vessel is made by injection blow moulding from extruded PET. Injection blow moulding from PET is an economical method for production vessels. PET is suitable for high pressure applications.

According to another embodiment of the fluid dispensing system the lower hemisphere comprises at least three outstanding lobes. The lobes may have a triangle shaped base.

According to a further embodiment of the fluid dispensing system, the ring shaped member comprises a middle protruding ring part having a width substantially larger than the width of the ring shaped member for receiving the upper and lower hemispheres. Through the larger width of the middle protruding ring part compared to the ring shaped member for receiving the upper and lower hemispheres, the upper and lower hemispheres can be pressed over the ring shaped member for receiving the upper and lower hemispheres.

According to another embodiment of the fluid dispensing system, the ring shaped member comprises carbon black and is connected to the upper and lower hemispheres by laser-welding. Through the carbon black the laser beam will absorbed by the plastic such that may connectable by laser-welding.

According to a further embodiment of the fluid dispensing system, the ring shaped member is glued to the upper and lower hemispheres. The ring shaped member may be glued by a hot melt glue to the upper and lower hemispheres. Gluing allows a solid connection between the ring shaped member and the upper and lower hemispheres. Especially for smaller quantities gluing can be an economical option.

According to another embodiment of the fluid dispensing system the neck portion of the top opening may be reinforced. The neck portion may comprising two parallel reinforcing rings. The reinforcing may increase the strength of the neck portion.

According to a further embodiment of the fluid dispensing system the high-pressure vessel is mounted on its bottom side on a support and the fluid dispensing container is mounted also on its bottom side to the support, such that the container is surrounding the pressure vessel by releasing a spherical space containing the fluid to be dispensed. The high-pressure vessel and the dispensing container may have an ellipsoid shape. Through the arrangement of the high-pressure vessel inside the fluid dispensing container, the spherical space is released between the high-pressure vessel and the container.

BRIEF DESCRIPTION OF THE FIGURES

In the following, the invention is described in greater detail, by way of example, with reference to the accompanying drawings. It shows.

DETAILED DESCRIPTION OF PREFERRED EMBODIMENTS

Figure 1:
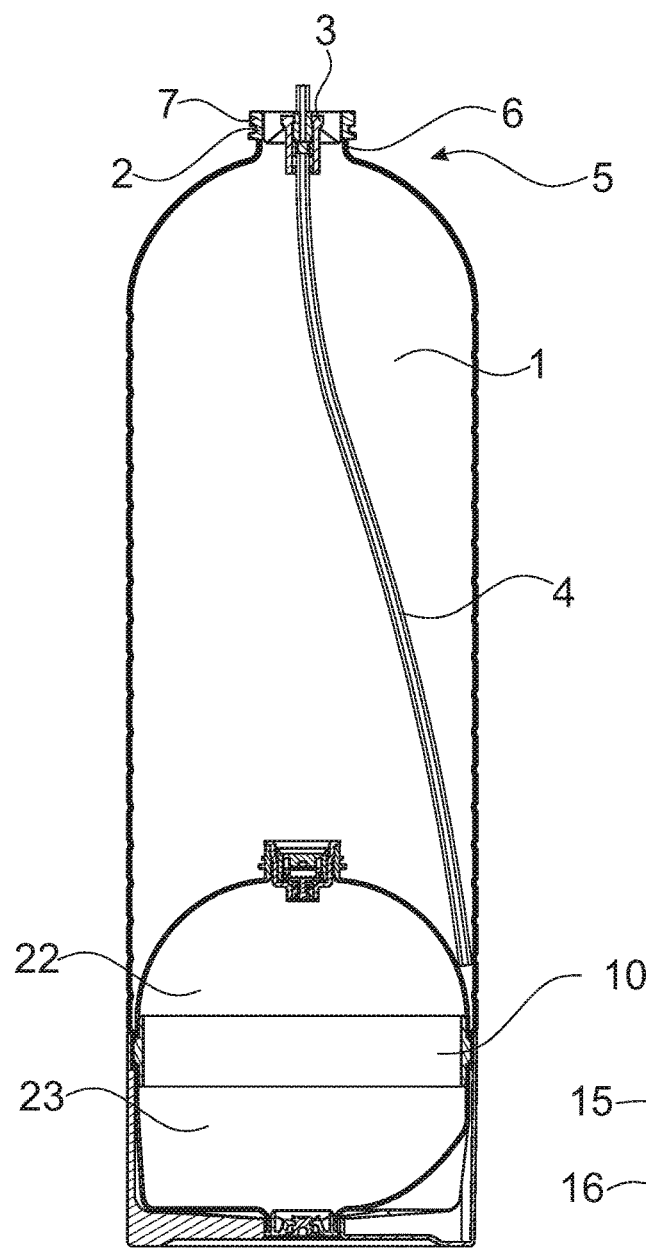
FIG. 1 is a plastic liquid container with a pressure control system with a spherical high-pressure vessel.
Figure 2:
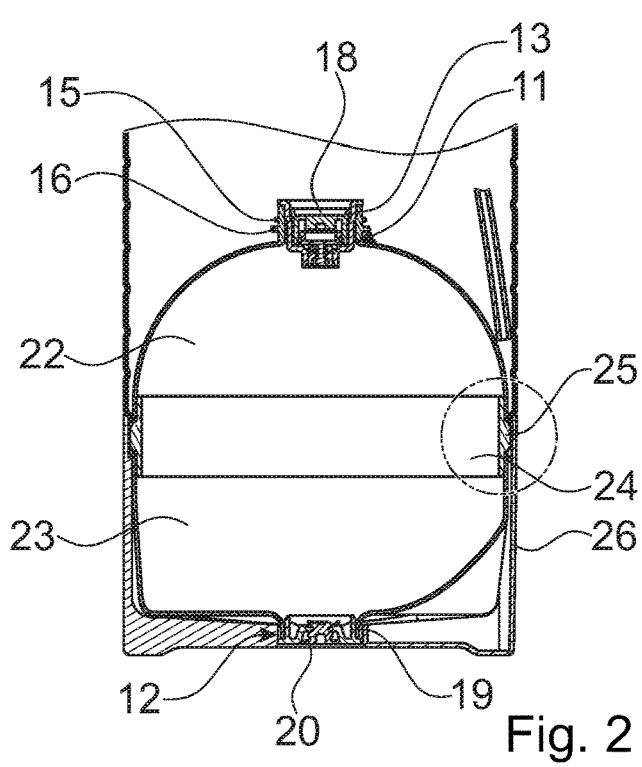
FIG. 2 shows an elevation of the high-pressure vessel in FIG. 1.

In FIGS. 1 and 2 a fluid dispensing container 1 of plastic material e.g. PET is shown which has an upper closure 2 with a valve 3 and a dip tube 4. The upper end 5 of the container 1 is spherical with a neck part 6 having a rim 7. The closure 2 is mounted on rim 7. The lower open end 8 of the container 1 is connected to a high-pressure vessel 10 which has an essentially spherical form. On top of the high-pressure vessel 10 there is a top opening 11 and on the bottom there is a bottom opening 12. The neck portion 13 of the top opening is reinforced, i.e. has a larger thickness as the wall thickness of the vessel 10. In addition two parallel reinforcing rings 15 and 16 are provided on the neck portion 13. A pressure control device 18 is mounted on the neck portion 13 in the same manner as described in WO-A-2005/082744. The pressure control device 18 has essentially the same construction as described therein. The bottom opening 12 is provided with an adapter ring 19 with a larger thickness as the wall thickness of the vessel 10, which is closed by a Nicholson plug 20 of rubber. The adapter ring 19 is preferably moulded with the high-pressure vessel 10.

The vessel 10 is provided of an upper vessel half or hemisphere 22 and a lower vessel half or hemisphere 23 which have both an essentially half-spherical form. Both hemispheres 22 and 23 are connected by a connecting ring 24, which is made of a thermoplastic elastomer material as e.g. PP, PS PMMA or PC which can be welded with PET. The connecting ring or ring shaped member 24 has a middle protruding ring part 25 such that the lower open end of vessel half 22 is pressed on the connecting ring 24. A cylindrical bottom part or base cup 26 is circumventing the lower vessel half 23 and is also welded or glued to the connecting ring 24. The adapter ring 19 is formed to be connected with the lower neck of the base cup 26.

Basically the two hemispheres 22 and 23 are produced by injection blow moulding from PET and can be identical and connected mirrored to each other. Extruded PET has the property to absorb very high lateral forces, so that the hemispheres 22 and 23 can withstand high pressures of more than 8 bar.

Figure 3:
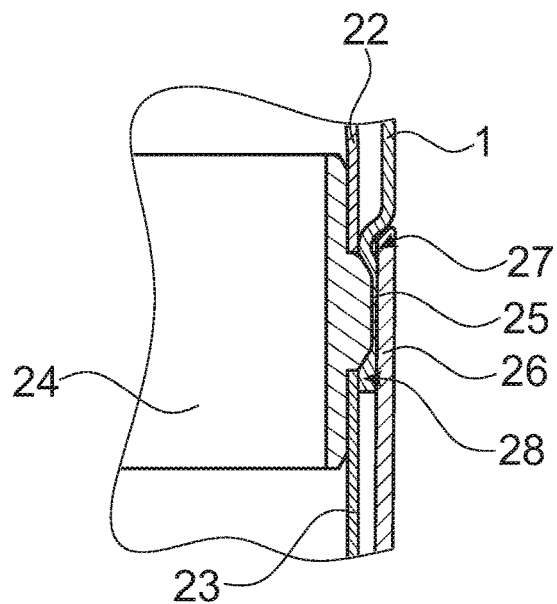
FIG. 3 shows an elevation of the connection between the upper and lower part of the high-pressure vessel in FIG. 2.

In FIG. 3 the connection of the connecting ring 24 to the upper half 22, the lower half 23, the fluid dispensing container 1 and the base cup 26 can be seen in more detail. The upper end 27 of the base cup 26 is overlapping the lower end 28 of the container 1.

Figure 4:
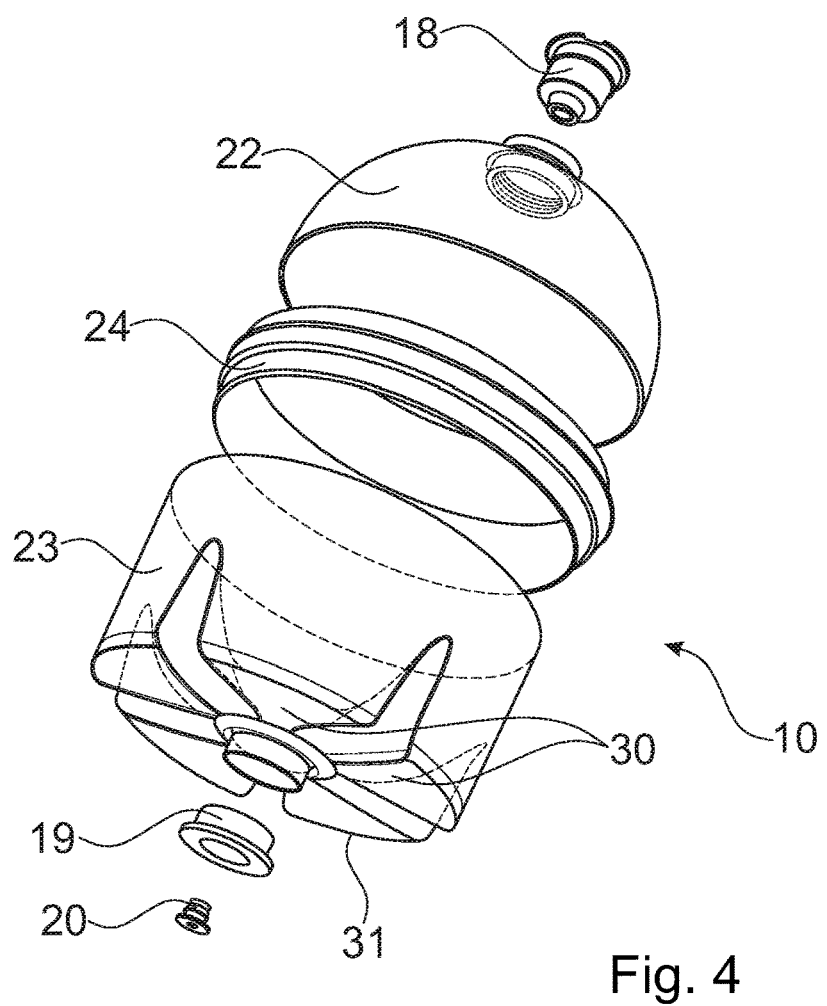
FIG. 4 shows a perspective and exploded view of the high-pressure vessel with the upper pressure control device and the lower Nicholson plug.

FIG. 4 shows the high-pressure vessel 10 in perspective and exploded view. The lower hemisphere 23 has four outstanding lobes 30 which are evenly distributed over its bottom part 31. In practice the number of outstanding lobes 30 must be at least three. The lobes 30 have a triangle shaped base.

Figures 5, 6:
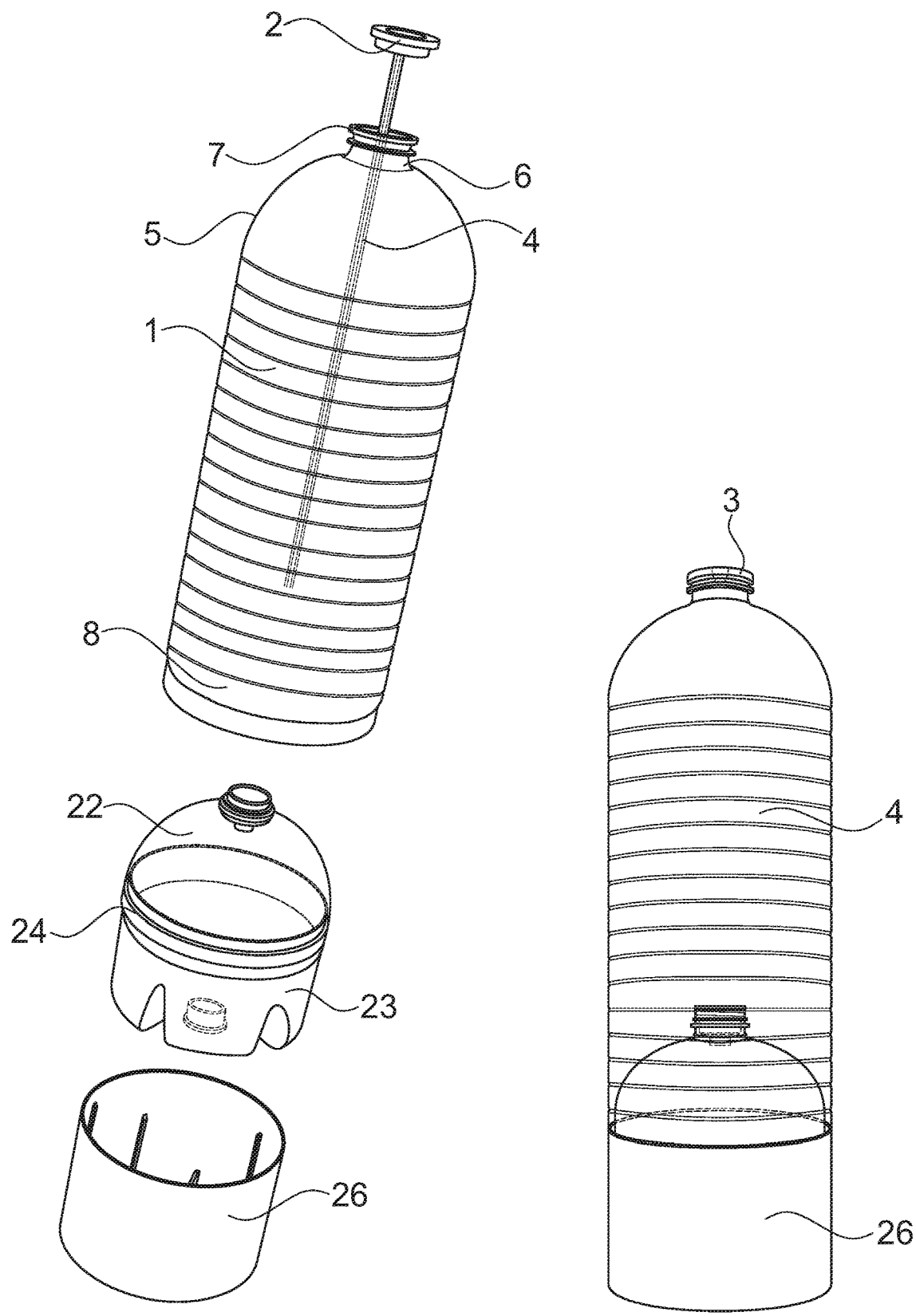
FIG. 5 shows a perspective and exploded view on the fluid dispensing container and the high-pressure vessel and the cylindrical bottom part.
FIG. 6 shows the fluid dispensing container in assembled mode.

FIG. 5 shows the combination of the fluid dispensing container or bottle 1 with the high-pressure vessel 10 and the cylindrical bottom part or base cup 26 in exploded view and FIG. 6 the combination in assembled mode.

Figure 7:
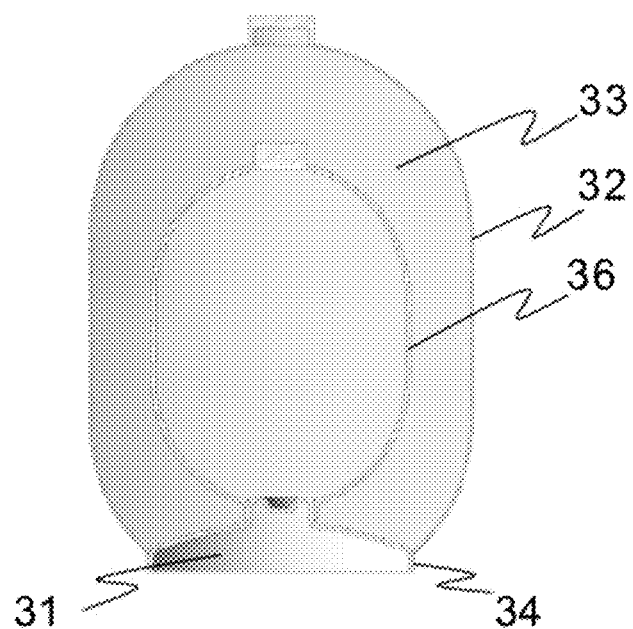
FIG. 7 shows a fluid dispensing container and a high-pressure vessel both having an ellipsoid shape.

FIG. 7 shows a high-pressure vessel 36 which has a stretched ellipsoid shape and an outer fluid dispensing container 32 which has a similar stretched ellipsoid shape of larger diameter such that a spherical space 33 is released between the high-pressure vessel 36 and the container 32. The high-pressure vessel 36 is mounted on its bottom side on a truncated conical support 31. The dispensing container 32 is mounted on the bottom side on the outer rim 34 of the support 31.

Figure 8:
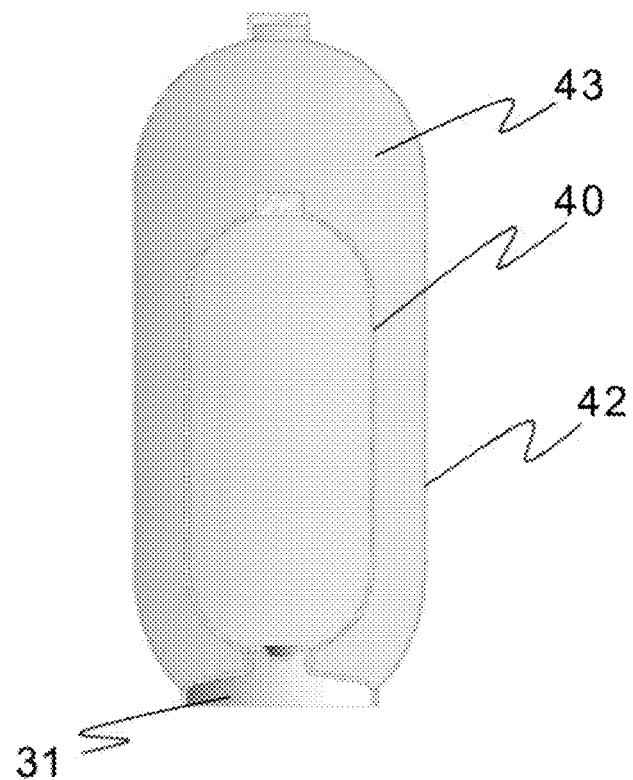
FIG. 8 shows a fluid dispensing container and a high-pressure vessel both having an elongate ellipsoid shape.

As can be seen in FIG. 8 the high-pressure vessel 40 and the fluid dispensing container 42 have a larger elongated shape as in FIG. 7, so that a larger volume of fluid can be contained in the container 42.

While the present invention has been illustrated and described with respect to a particular embodiment thereof, it should be appreciated by those of ordinary skill in the art that various modifications to this invention may be made without departing from the spirit and scope of the present.

What is claimed is:

1. A high-pressure plastic vessel for use in a pressure control system provided for maintaining a constant predetermined excess pressure in a fluid dispensing container, said high-pressure vessel comprising an inner chamber, a closed end at the bottom and an open end on top, and a pressure control device with a valve, wherein the pressure control device is mounted on the open end on top of the high-pressure vessel, whereas a passageway is provided from the inner chamber to an outside of the high-pressure vessel, which passageway is controlled by the valve, wherein the high-pressure vessel comprises:

an upper portion and a lower portion, said upper portion having an essentially half-spherical form and said lower portion having an essentially cylindrical form and comprises at least three outstanding lobes having a triangular-shaped base, wherein the upper and lower portions essentially have the same height and are both made by injection blow moulding from extruded PET, and being connected to one another by a ring-shaped member to form the high-pressure vessel, wherein the lower end of the lower portion integrally forms the bottom of the high-pressure vessel.

2. The high-pressure plastic vessel according to claim 1, wherein the ring-shaped member comprises a middle ring part protruding outwards from another part of the ring-shaped member for receiving the upper and lower portions.

3. The high-pressure plastic vessel according to claim 2, wherein the ring-shaped member comprises carbon black and is connected to the upper and lower portions by laser-welding.

4. The high-pressure plastic vessel according to claim 2, wherein the ring-shaped member is glued to the upper and lower portions.

5. The high-pressure plastic vessel according to claim 4, wherein the ring-shaped member is glued by a hot melt glue to the upper and lower portions.

6. The high-pressure plastic vessel according to claim 1, wherein the neck portion of the top opening of the high-pressure vessel is reinforced.

7. The high-pressure plastic vessel according to claim 6, wherein the neck portion comprising two parallel reinforcing rings.

8. A fluid dispensing container comprising a pressure control system using a high-pressure plastic vessel according to claim 1, wherein the high-pressure vessel is mounted on a bottom side on a support and the fluid dispensing container is mounted also on the bottom side to the support, such that the container is surrounding the pressure vessel creating a spherical space containing a fluid to be dispensed.

9. The fluid dispensing container according to claim 8, wherein the high-pressure vessel and the dispensing container have an ellipsoid shape.

10. A fluid dispensing container comprising a pressure control system using a high-pressure plastic vessel provided for maintaining a constant predetermined excess pressure in the fluid dispensing container, said high-pressure vessel comprising an inner chamber, a closed end at the bottom and an open end on top, and a pressure control device with a valve, wherein the pressure control device is mounted on the open end on top of the high-pressure vessel, whereas a passageway is provided from the inner Chamber to an outside of the high-pressure vessel, which passageway is controlled by the valve, wherein the high-pressure vessel has a stretched ellipsoid shape, which is made by injection blow moulding from a preform of extruded PET, wherein the high-pressure vessel is mounted on a bottom side on a support and the fluid dispensing container is mounted also on the bottom side to the support, such that the container is surrounding the pressure vessel creating a spherical space containing a fluid to be dispensed.

* * * * *